United States Patent Office 3,465,476
Patented Sept. 9, 1969

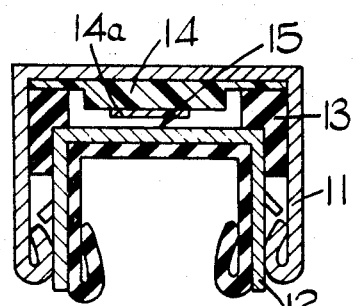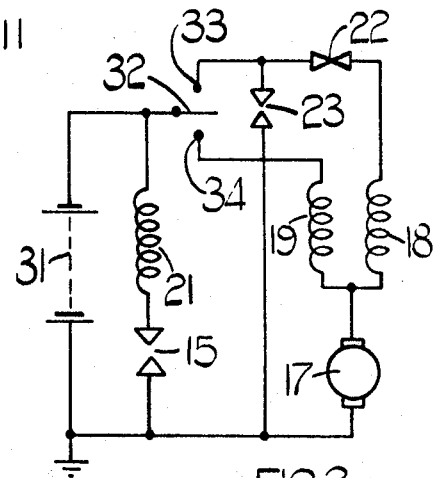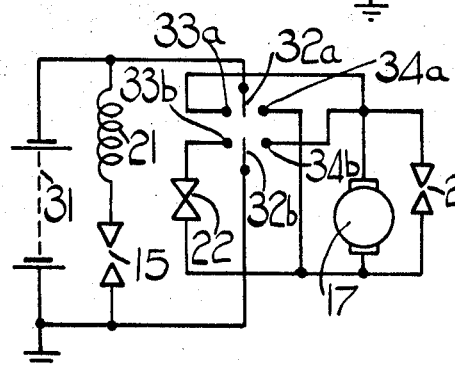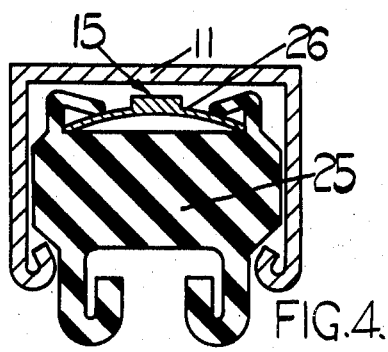

3,465,476
SAFETY ARRANGEMENTS FOR POWER OPERATED WINDOWS IN ROAD VEHICLES
Christopher Stephen Rayner, Kings Norton, Birmingham, and David Thomas, Solihull, England, assignors to Joseph Lucas (Industries) Limited, Birmingham, England, a British company
Filed Nov. 24, 1967, Ser. No. 685,669
Claims priority, application Great Britain, Dec. 5, 1966, 54,255/66
Int. Cl. E05f 15/20, 15/14
U.S. Cl. 49—28        4 Claims

ABSTRACT OF THE DISCLOSURE

A safety arrangement for a power operated window in a road vehicle includes a switch associated with the fixed frame of the window, so that the switch is actuated in the event that an obstruction is placed between the window and the fixed frame whilst the window is being raised, there being provided means operable upon actuation of said switch for stopping raising of the window.

---

This invention relates to safety arrangements for power operated windows in road vehicles.

An arrangement according to the invention includes a switch associated with the fixed frame of a window, so that the switch is actuated in the event that an obstruction is placed between the window and the fixed frame whilst the window is being raised, and means operable upon actuation of said switch for stopping raising of the window.

In the accompanying drawings:

FIGURE 1 is a sectional view of part of a power operated window used in an assembly according to one example of the invention, FIGURES 2 and 3 respectively are circuit diagrams of alternative circuits for operating the window, and FIGURE 4 is a sectional view illustrating an alternative form of switch to that shown in FIGURE 1.

Referring first to FIGURE 1 there is provided a fixed conductive window frame 11 which is of inverted U-shaped cross-section and which extends along at least the top edge of the window aperture in the door of the vehicle. The base of the frame 11 carries a rubber strip 14 on which is mounted a conductive strip 14a. Slidable in the U-shape of the frame 11 and electrically connected thereto is a conductive part 12 also of inverted U-shaped cross-section the part 12 being spaced from the strip 14a by rubber buffers 13, and projecting downwardly from the frame 11. A draught exclusion strip is mounted within the part 12 so as to grip the upper edge of the window pane when the window is in its closed position. In normal operation of the window, when the window is closed the switch 15 defined by the part 12 and the strip 14a is open and the upper edge of the window pane seats in the part 12. However, if an obstruction is placed between the window pane and the part 12 as the window is raised the part 12 will be forced inwardly against the action of the rubber buffers 13 so that it engages the strip 14a and so closes the switch 15.

Referring now to FIGURE 2, the switch 15 is connected in series with the relay coil 21 across the battery 31 of the road vehicle with which the window is associated. The negative terminal of the battery is connected to the movable contact 32 of a control switch, the contact 32 being movable from its neutral position shown into engagement with fixed contacts 33 or 34. The contact 33 is connected to the positive battery terminal through a series circuit including a pair of normally closed contacts 22 of the relay 21, a field winding 18 of the motor which operates the window, and the armature 17 of the motor. The contact 34 is connected to the positive battery terminal through another field coil 19 on the armature 17.

When it is desired to lower a raised window, the contact 32 is moved into engagement with the contact 34, so completing a circuit to the motor 19, 17 in a manner to lower the window. When it is desired to raise the window, the contact 13 is moved into engagement with contact 33, so energising the motor through the contacts 22. If the switch 15 is actuated by an obstruction, it closes so energising the relay 21, which opens the contact 22 to break the circuit to the motor, and at the same time closes a pair of normally open contacts 23 connected between the contact 33 and the positive battery terminal, to short-circuit the winding 18 and armature 17 to contribute dynamic braking.

FIGURE 3 shows an arrangement similar to FIGURE 2 for use with a permanent magnet motor. In FIGURE 3, parts equivalent to those in FIGURE 2 are designated with the same reference numerals, and it will be seen that, in addition to the omission of windings 18, 19, the contact 32 is replaced by a pair of ganged movable contacts 32a, 32b which when it is desired to raise the window are moved into engagement with fixed contacts 33a, 33b, and which when it is desired to lower the window are moved into engagement with fixed contacts 34a, 34b. The two pairs of fixed contacts are oppositely connected to the motor 17 so as to operate it in opposite directions respectively, and the contacts 22 and 23 operate in exactly the same way as in FIGURE 2.

In both FIGURES 2 and 3 the contacts 23 contribute dynamic braking, but the circuit can be re-arranged so that the contacts 23 actually reverse the direction of operation of the motor, so that the window is lowered.

The switch 15 could of course take a variety of forms. For example, it could be constituted by a sealed tube compression of which would operate a pressure switch. FIGURE 4 illustrates another form of switch, in which upper part of the frame 11 has a rubber block 25 mounted therein. The block 25 is recessed along its upper edge and a conductive flexible strip 26 is mounted in the recess in the block 25. The block 25 projects from the lower edge of the frame 11 so that any obstruction serves to compress the block 25 inwardly to close the switch 15 defined by the strip 26 and the frame 11. The switch 15 could be incorporated in the circuit of FIGURE 2 or FIGURE 3.

It will be appreciated that since the block 25 and strip 26 are flexible they can extend around the periphery of the frame 11 rather than just along the upper edge thereof. This construction is particularly useful in window arrangements utilizing non-rectangular window panes wherein a gap is left at the sides as well as at the top of the window pane when the window pane is lowered.

Having thus described our invention what we claim as new and desire to secure by Letters Patent is:

1. A safety arrangement for a power operated window in a road vehicle, said window moving in a fixed frame having a top edge and side edges, said arrangement including a switch associated with the fixed frame of the window, said switch having a fixed part and a movable part which is moved into engagement with said fixed part to actuate the switch in the event that an obstruction is placed between the window and the fixed frame while the window is being raised, and means operable upon actuation of said switch for stopping raising of the window, said movable part of the switch comprising a flexible member extending along and secured to both the top edge of said fixed frame and one of said side edges of said fixed frame.

2. An arrangement as claimed in claim 1 in which said switch operates a relay for breaking the circuit to the motor operating the window.

3. An arrangement as claimed in claim 1 in which said switch operates a relay for reversing the direction of operation of the motor operating the window.

4. An arrangement as claimed in claim 2 in which the relay also serves to short-circuit the motor.

References Cited

UNITED STATES PATENTS

| 1,864,048 | 6/1932 | McNutt | 49—28 X |
| 2,881,378 | 4/1959 | Russell | 49—28 X |

DAVID J. WILLIAMOWSKY, Primary Examiner

J. K. BELL, Asistant Examiner

U.S. Cl. X.R.

200—61.71